United States Patent [19]

Schmidt

[11] Patent Number: 5,255,443
[45] Date of Patent: Oct. 26, 1993

[54] POST LEVEL WITH DETENT

[75] Inventor: Sheldon P. Schmidt, Paramus, N.J.

[73] Assignee: Great Neck Saw Manufacturing, Inc., Mineola, N.Y.

[21] Appl. No.: 969,067

[22] Filed: Oct. 30, 1992

[51] Int. Cl.$^5$ .................................................. G01C 9/28
[52] U.S. Cl. ........................................ 33/373; 33/379; 33/390
[58] Field of Search ................. 33/348.2, 353, 379, 33/380, 381, 382, 383, 384, 385, 386, 387, 388, 389, 390, 351, 369, 370, 371, 372, 373, 333, 334, 335, 339, 451; D10/69; 7/119, 150, 163, 164

[56] References Cited

U.S. PATENT DOCUMENTS

| | | | |
|---|---|---|---|
| D. 255,504 | 6/1980 | Vanderwerf | D10/74 |
| D. 257,330 | 10/1980 | VanderWerf | D10/69 |
| D. 261,626 | 11/1981 | VanderWerf | D10/69 |
| D. 280,302 | 8/1985 | Clark | D10/69 |
| D. 288,539 | 3/1987 | VanderWerf | D10/69 |
| D. 288,540 | 3/1987 | VanderWerf | D10/69 |
| D. 288,541 | 3/1987 | VanderWerf | D10/69 |
| D. 291,962 | 9/1987 | Johnson et al. | D8/95 |
| D. 293,044 | 12/1987 | Johnson | D3/30.1 |
| 908,406 | 12/1908 | Henderson | 33/385 |
| 1,109,024 | 9/1914 | Sutton | 33/388 |
| 1,592,734 | 7/1926 | Hagstrom | 33/388 |
| 3,324,564 | 6/1967 | Wright et al. | 33/206 |
| 3,583,073 | 6/1971 | Balint | 33/211 |
| 3,747,221 | 7/1973 | Ostrager | 33/383 |
| 3,766,657 | 10/1973 | Hopkins | 33/384 |
| 3,820,249 | 6/1974 | Stone | 33/390 |
| 4,125,490 | 11/1978 | Hettinga | 521/51 |
| 4,168,578 | 9/1979 | VanderWerf | 33/371 |
| 4,463,501 | 8/1984 | Wright et al. | 33/350 |
| 4,559,714 | 12/1985 | Wright | 33/379 |
| 4,571,845 | 2/1986 | Wright et al. | 33/379 |
| 4,581,828 | 4/1986 | Handler et al. | 33/379 |
| 4,936,014 | 6/1990 | Shaanan et al. | |
| 4,966,777 | 3/1991 | Grosz . | |
| 5,027,951 | 7/1991 | Johnson | 206/443 |
| 5,105,549 | 4/1992 | Johnson | 33/379 |
| 5,207,004 | 5/1993 | Greuetzmacher | 33/379 |

FOREIGN PATENT DOCUMENTS

| | | | |
|---|---|---|---|
| 0844666 | 7/1949 | Fed. Rep. of Germany | 33/386 |
| 0813600 | 9/1951 | Fed. Rep. of Germany | 33/379 |
| 3606774 | 9/1987 | Fed. Rep. of Germany | 33/371 |
| 0041311 | 2/1991 | Japan | 33/379 |

Primary Examiner—Thomas B. Will
Attorney, Agent, or Firm—Lovercheck and Lovercheck

[57] ABSTRACT

A post level having two spaced holders fixed to two plate-like body members with a notch between the holders. A floor member is integrally attached to the body members. Each holder provides a channel that receives the end of a level vial. One of the holders has a stop to engage an end of the vial. The other holder has a detent fixed thereto that urges and resiliently engages a second end of the vial to hold the vial in position in the holder.

17 Claims, 3 Drawing Sheets

POST LEVEL WITH DETENT

BACKGROUND OF THE INVENTION

The present invention relates to levels and more particularly to post levels which have two body members with working surfaces held at right angles to one another. The entire level can be injection molded of a single part and level vials inserted after molding. The vials are moved axially into channels in the level body and held in place by resilient detents.

The level of the present invention differs from other similar levels in the method disclosed for assembling and retaining the vials. Previously, the round vials were pushed into C-shaped grooves with minimal undercuts slightly below center. These undercuts hold the vial in place and make it difficult to push the vial out of the C-shaped groove. However, applying sufficient pressure to the vial perpendicular to the plastic holder during use, could pop the vial out of the C-shaped groove using this type of assembly. In the method of the present invention, the vial is pushed lengthwise into a D-shaped channel past a flexing one-way detent or snap. Open areas around the detent allow it to flex. A lead on one side only allows the vial to easily slide past the detent, but not back out, unless the detent is purposely flexed by the user, which is unlikely. The straight wall of the D-shaped channel prevents the vial from being pushed out of the holder in the perpendicular direction.

Applicant is aware of the following U.S. Pat. Nos.:

Des. 255,504 to Vanderwerf for a spirit level vial container.
Des. 257,330 to VanderWerf for a corner level.
Des. 261,626 to VanderWerf for a corner level.
Des. 280,302 to Clark for a level vial holder.
Des. 288,539 to VanderWerf for a four way corner level.
Des. 288,540 to VanderWerf for a four way corner level.
Des. 288,541 to VanderWerf for a four way corner level.
Des. 291,962 to Johnson et al. for a hacksaw for hand use Des. 293,044 to Johnson for a capped case for holding and transporting a carpenter's level.
3,324,564 to Wright et al. for a level with electrically responsive instrument.
3,583,073 to Balint for a level vial construction.
4,125,490 to Hettinga for a method of forming dimensionally stable foamed articles of polyvinyl aromatic resins and resultant product.
4,168,578 to VanderWerf for a four way corner level.
4,463,50; to Wright et al. for a level construction and methods of constructing a level.
4,559,714 to Wright for a pitch measuring apparatus.
4,571,845 to Wright et al. shows a level with a vial that fits into arc upwardly facing open slots. The entrance side lots are smaller than the vial so that the material of the level body overlies part of the level vial when the vial is in the slot thereby holding the vial in place.
4,936,014 to Shaanan et al. for a utility knife.
4,996,777 to Grosz for a snap-in level vial cover.
5,027,951 to Johnson for an apparatus and method for packaging of articles.
5,105,549 to Johnson for a level with top-reading magnification.

None of the prior art shows a level with a channel in its body with a stop at one end and a detent in the other end so that a vial may be pushed past the detent, into the channel, against the stop whereby the detent snaps back into place when the vial engages the stop.

SUMMARY OF THE INVENTION

It is an object of the invention to provide an improved level.

It is another object of the invention is to provide an improved method of assembling a level.

It is another object of the present invention to provide a post level that is simple in construction, economical to manufacture and simple and efficient to use.

With the above and other objects in view, the present invention consists of the combination and arrangement of parts hereinafter more fully described, illustrated in the accompanying drawing and more particularly pointed out in the appended claims, it being understood that changes may be made in the form, size, proportions and minor details of construction without departing from the spirit or sacrificing any of the advantages of the invention.

BRIEF DESCRIPTION OF THE DRAWING(S)

DESCRIPTION OF THE PREFERRED EMBODIMENT(S)

Figure 1:
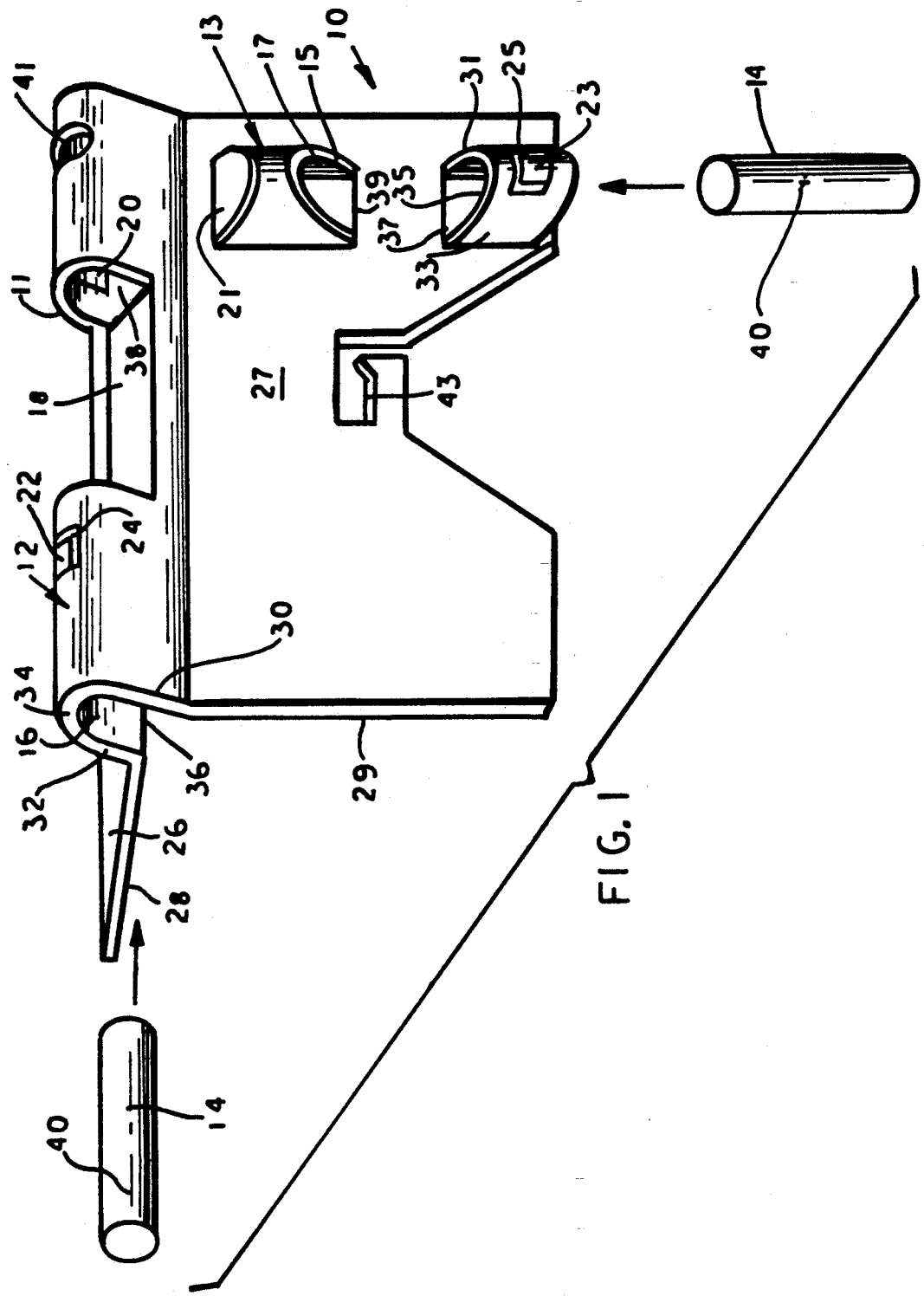
FIG. 1 is an exploded isometric view of the post level according to the invention.
Figure 2:
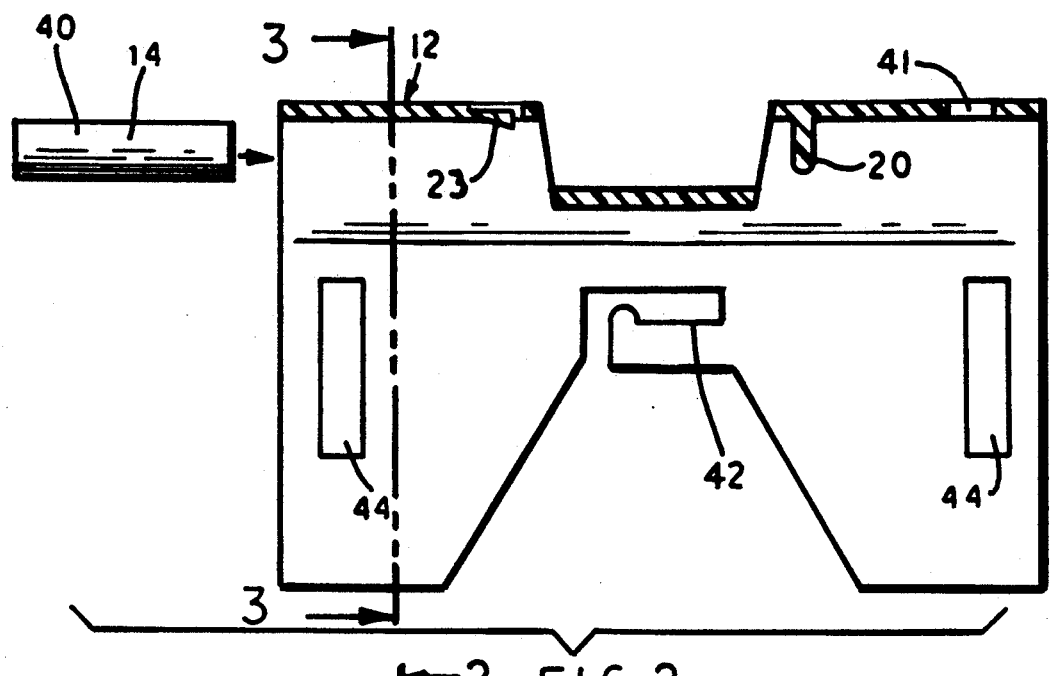
FIG. 2 is an exploded longitudinal cross sectional view of the level taken on line 2—2 of FIG. 3.
Figure 3:
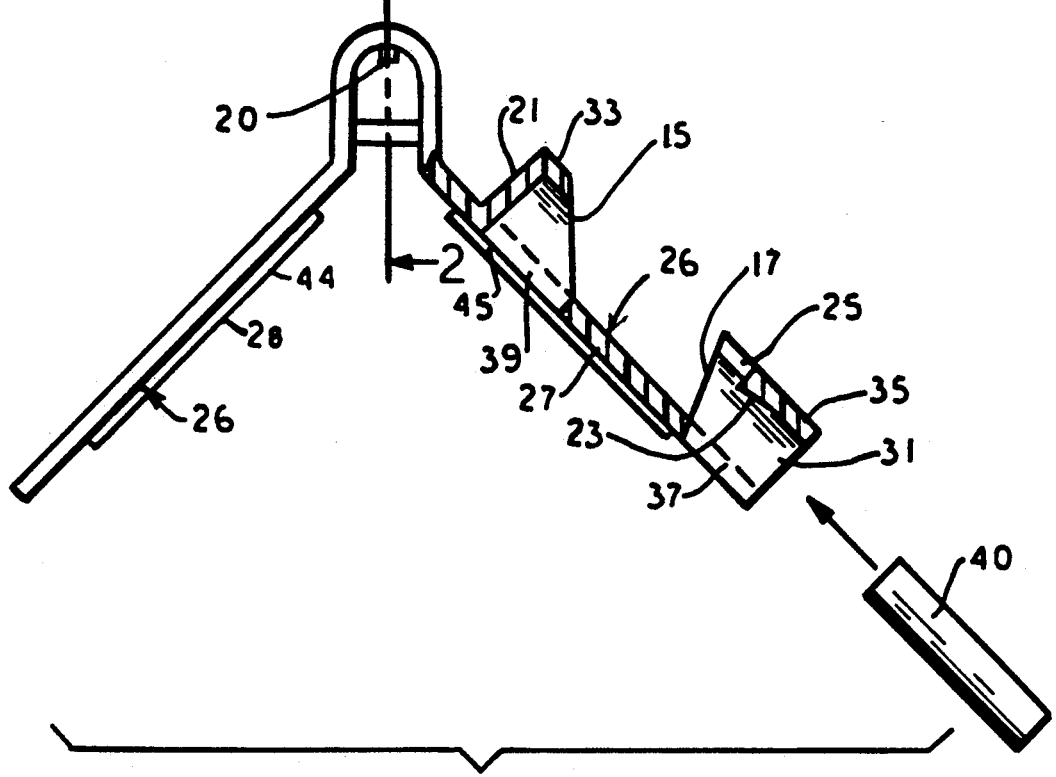
FIG. 3 is a lateral cross sectional view of the level taken on line 3—3 of FIG. 2.

Now with more particular reference to the drawings, shown is post level 10, preferably injection molded of thermoplastic, having integrally attached first vial holder 12, second vial holder 13 and third vial holder 113.

First vial holder 12 has notch 11 with edges forming a viewing opening, D-shaped channel 16 extending through first vial holder 12, and floor 18 integrally attached to first plate-like body member 26 and to second plate-like body member 27. Floor 18 terminates adjacent the edges of notch 11 and forms One side of D-shaped channel 16. Stop 20, integrally attached to first vial holder 12, extends downwardly and across D-shaped channel 16. Detent 22 is integrally attached to one side of holder opening 24 in first vial holder 12.

Second vial holder 13 has notch 15 with edges forming a viewing opening, and D-shaped channel 17 extending therethrough. Second vial holder 13 has a closed end, which acts as stop 21 to prevent vials 14 from moving through channel 17.

When Vials 14 are inserted into channels 16,17, vials 14 forces detents 22,23 to swing up into holder openings 24,25, out of the way of vials 14. When vials 14 are in position in holders 12,13, detents 22,23 will snap down behind vials 14 and thereby hold vials 14 in place. In the undeformed state, detents 22,23 rest against an end of vials 14 when vials 14 are inserted in D-shaped channels 16,17.

The body of level 10 is generally angular in cross section with first plate-like body member 26 rigidly and integrally attached to second plate-like body member 27 by means of first vial holder 12. First plate-like body member 26 is integrally attached to first vial holder 12 and has planar working surface 28. First vial holder 12, generally U-shaped, has first leg 30 and second leg 30 integrally connected together by cylindrical intermediate section 34.

Second plate-like body member 27 is integrally attached to second vial holder 13 and has planar working surface 29. Second vial holder 13, generally U-shaped, has first leg 31 and second leg 33 integrally connected together by cylindrical intermediate section 35.

First plate-like body member 26 and second plate-like body member 27 have body member openings 36,38 and 37,39 respectively, to facilitate injection molding of the body of level 10.

First vial holder 12 has hanger hole 41 for convenience in hanging post level 10 on a hanger.

When a post or corner member is to be leveled, first plate-like body member 26 is held along one wall at the corner and second plate-like body member 27 is held against an adjacent wall. Vials 14 will indicate the level condition of the post or corner. Vials 14 each have center line 40 that is parallel to planar working surfaces 28,29.

Slot 42 is formed in first plate-like body member 26 and slot 43 is formed in second plate-like body member 27 to receive a strap or rubber band for holding level 10 to a post or the like in a well-know manner.

Two flexible magnet strips 44 may be attached to the underside of first plate-like body member 26 and two flexible magnet strips 44,45 may be attached to the underside of second plate-like body member 27 for use in holding level 10 to a metal post or to a metal corner.

Figure 4:
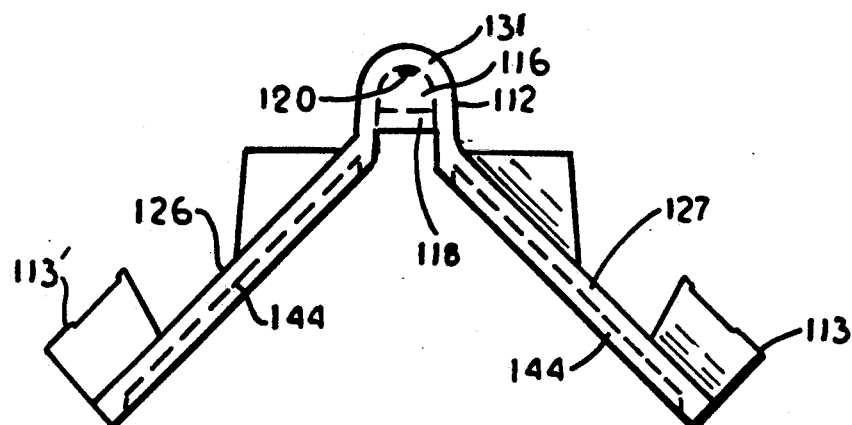
FIG. 4 is an end view of another embodiment of the invention.
Figure 5:
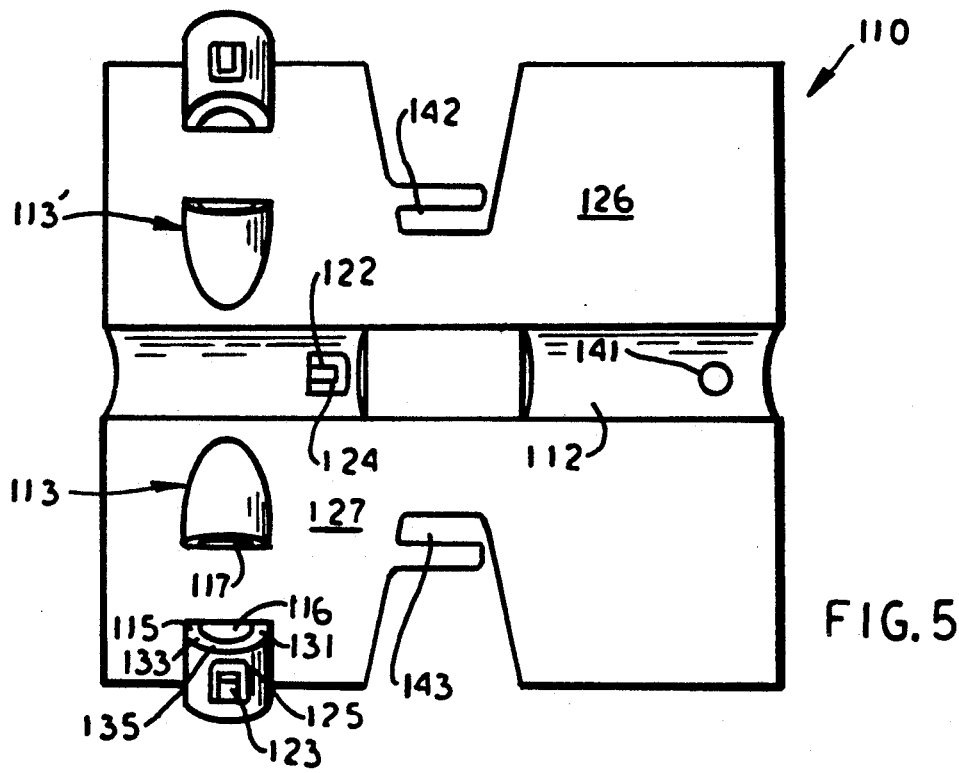
FIG. 5 is a top view of the embodiment shown in FIG. 4.
Figure 6:
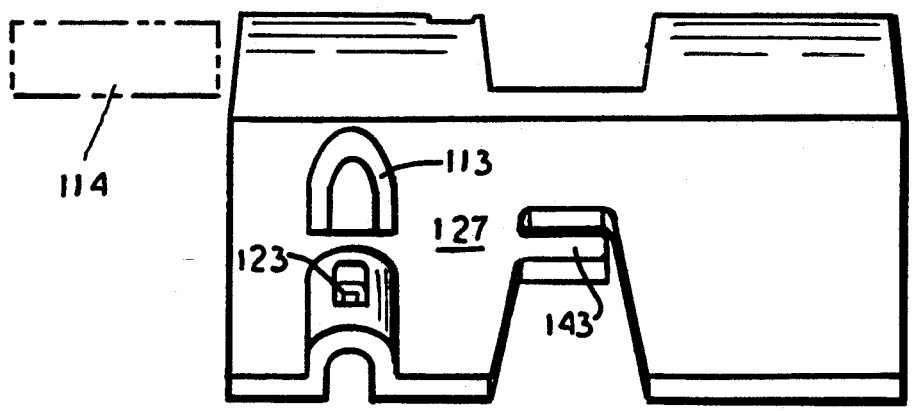
FIG. 6 is a side view of the embodiment shown in FIG. 4.

Now with more particular reference to embodiment of the invention FIGS. 4, 5 and 6, post level 110 has first vial holder 112, second vial holder 113 and third vial holder 113' to receive vial 114. Vial holders 112,113 and 113' each have notch 115 with edges forming a viewing opening. Second D-shaped channel 117 is defined by first leg 133, and second leg 131. Third leg 135 extends between legs 131 and 133. First plate-like body member 126 is integrally attached to second plate-like body member 127 by first vial holder 112. First D-shaped channel 116 has floor 118, stop 120 and detent 122. Detent 122 is disposed in a first holder opening 124. Second vial holder 113 has a closed end, which acts as a stop to prevent the vial from moving through second D-shaped channel 117. Detent 123 is integrally attached to one side of holder opening 125 in second vial holder 113.

When the vial 114 is inserted into first D-shaped channel 116, vial 114 forces detent 122 to swing up into second holder opening 124, pushing detent 122 out of the way of vial 114. When the vial 114 is in position in first vial holder 112, detent 122 will snap down behind vial 114 and thereby hold vial 114 in place. In the undeformed state, detent 122 rests against an end of the vial when the vial is inserted in first D-shaped channel 116 and second D-shaped channel 112.

Third vial holder 113', is generally U-shaped, and is similar to vial holder 112 and 113. Hole 141 is provided to receive a hanger for storing post level 110.

First slot 142 is formed in first plate-like member 126 and second slot 143 is formed in second plate-like member 127. Recesses 144 are formed in inner sides of plate-like members 126,127 to receive a flexible magnet to hold the level onto an iron post.

The foregoing specification sets forth the invention in its preferred, practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A level comprising a body member having a planar working surface;

a vial holder integrally attached to said body member;

said vial holder having a D-shaped channel extending therethrough;

a stop attached to said vial holder at a first end of said D-shaped channel;

a detent movably attached to said vial holder and spaced from said stop;

a level vial adapted to be pushed into said D-shaped channel with a first end of said vial resting against said stop and with said detent engaging a second end of said level vial.

2. The level recited in claim 1 wherein said detent is integrally attached to said vial holder.

3. The level recited in claim 2 wherein said vial holder has a notch therein;

said notch having edges adapted to form a view opening for viewing said level vial.

4. The level recited in claim 1 wherein, a second body member having a planar working surface is disposed at a right angle to said planar working surface of said body member.

5. The level recited in claim 4 wherein a second level vial is attached to said second body member and is disposed at a right angle to said first mentioned level vial.

6. The level recited, in claim 4 wherein said second body member has a second vial holder attached thereto and disposed at right angles to said first mentioned vial holder.

7. The level recited in claim 4 wherein a floor is integrally attached to said body member below said vial holder and said floor forms one side of said D-shaped channel.

8. The level recited in claim 7 wherein said floor terminates adjacent said edges of said D-shaped channel.

9. The level recited in claim 1 wherein said detent is integrally attached to said D-shaped channel and is adapted to be forced into an opening in said vial holder to allow said level vial to be slid into said D-shaped channel.

10. The level recited, in claim 1 wherein a second vial holder is supported on a second body member.

11. A level comprising a body member having a working surface on one side thereof;

a vial holder integrally attached to said body member;

a D-shaped channel in said vial holder extending generally parallel to said working surface;

said channel having a stop at a first end thereof and a detent attached to said holder at a second end of said channel;

an elongated level vial being adapted to be pushed into said channel against said stop;

said detent movably attached to said body member and adapted to be moved from a position out of alignment with said vial to a position against said vial thereby holding said vial against said stop.

12. The level recited in claim 11 wherein said level vial is elongated and has a center line;

said working surface of said first body member is disposed generally parallel to said center line of said level vial.

13. The level recited in claim 12 wherein a second elongated vial is provided having a center line; and, said center line of said second elongated vial adapted to be generally perpendicular to said center line of said first mentioned vial.

14. The level recited in claim 11 wherein said vial holder has a hangar hole therein for holding up said level.

15. The level recited in claim 13 wherein said body member has a support means comprising slots for receiving an elongated member to attach said level to a post.

16. The level recited in claim 13 wherein said support means comprises a magnetic member fixed to said body member.

17. The level recited in claim 10 wherein said body member has support means attached thereto for supporting said level on a post.

* * * * *